Patented July 12, 1932

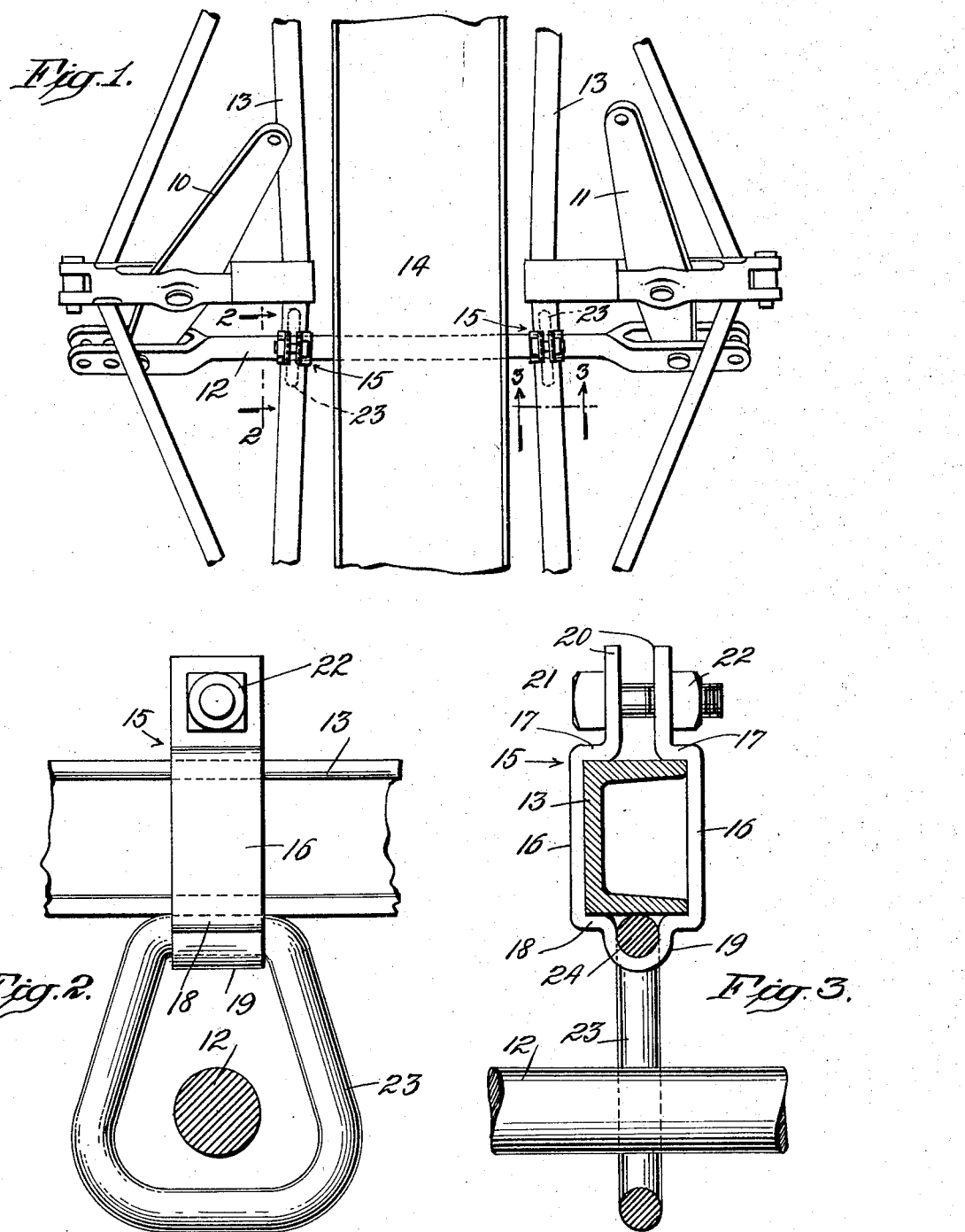

1,867,000

UNITED STATES PATENT OFFICE

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK

SAFETY SUPPORT FOR BRAKE RODS

Application filed May 14, 1930. Serial No. 452,229.

In co-pending application Serial No. 452,-228, filed on even date herewith, there is shown, described and claimed an adaptation of the principle of the present invention to the spring plank of a car truck whereby there is provided a stationary point of attachment of a safety support for the bottom rod which connects the two brake levers of the brake mechanism. Under the present specific invention the improved safety support for brake rods is attached to each of the brake beams, which of course are movable and not stationary. Therefore, under the present invention the means for attaching the safety support to a brake beam is preferably of different construction, so as to be peculiarly adapted to attachment to and suspension from a brake beam.

In each invention the principal object is to provide means for supporting a movable rod supporting member, as, for example, a loop or stirrup from a main support, but under the present invention the support of the movable rod supporting member is from a brake beam, and in both inventions the rod supporting member or the like is held against movement, vibration or rattling under normal conditions, but the rod supporting member is permitted to swing fore or aft in case it strikes an obstruction such as a pile of coal or ballast, for example, which projects between the rails of the track. Also under the present invention the rod supporting loop or stirrup may be hung from a pivotal connection, thereby overcoming the objections which many railways have to bottom rod supports on account of their being rigid and breaking, or bending sufficiently to bind the rod and render the brake ineffective.

In the practice of the present invention, under which the bottom rod support is attached, one to each brake beam, it is preferred to suspend such rod support so as to be subject to such friction as shall prevent it from moving out of position under normal conditions and to yield and overcome such friction under the impact caused by striking an obstruction.

Other objects of the invention are to provide a safety support for the bottom connecting rods of brake levers and which is of simple construction adapting it to be attached to a brake beam, which support is comparatively inexpensive considering the function it performs, and which is economical in service, and is well adapted to be attached to a brake beam for performing its functions because such brake beam is separately supported from independent emergency supports.

These being among the objects of the present invention, the same consists of certain features of construction and combinations of parts to be hereinafter described and then claimed with reference to the accompanying drawing illustrating a preferred embodiment of the invention, in which:

Figure 1 is a plan of such parts of the brake mechanism of a railway car truck as is sufficient to illustrate the present invention as supported from the two brake beams.

Fig. 2 is an enlarged section transversely of the bottom connecting rod on the line 2—2, Fig. 1, showing the improvements in elevation, and Fig. 3 is an enlarged detail section on the line 3—3, Fig. 1.

Referring to Fig. 1, the brake levers 10, 11 constitute the live and dead levers of the brake mechanism and the lower ends are connected together by the bottom connecting rod 12, said bottom rod being located below the two brake beams 13, which are partly broken away. The spring plank 14 of the car truck is shown between the brake beams.

In carrying out the objects of the present invention suitable attaching brackets 15 are provided which are constructed and formed for securement to the compression members of the brake beams 13, so that there will be an attaching bracket 15 located at each side of the spring plank. Each of these attaching brackets 15 is preferably formed from suitable strip metal bent into such form, preferably as shown in Figs. 2 and 3, so that they will furnish the necessary supporting strength.

Each metal strip 15 is doubled upon itself and bent preferably in such a manner as to provide two opposite flat portions 16 at the sides, which constitute the main length of each bracket. The upper ends of the flat side portions 16 are bent inwardly or deflected so as to provide a pair of shoulders 17, 17, the connecting portion 18 at the other ends of the side portions 16 being formed with a downwardly extending partially cylindrical bearing portion 19. The ends of the connecting portion 18 constitute another pair of shoulders which may be engaged with the underside of either of the compression members of the brake beams, while the shoulders 17 may be brought into engagement with the upper surface of the compression member. At the inner ends of the shoulder 17 there is a pair of parallel terminal lugs 20 which are spaced apart and connected by means of a bolt 21 to which the securing nut 22 and a lock-nut, if desired, is applied.

A loop or stirrup 23 is provided through which the connecting rod 12 extends, and the loop or stirrup has a straight cylindrical portion or journal 24 which has a bearing in the cylindrical bearing portion 19 of the attaching bracket 15. The fit of the straight part 24 of the loop in the bearing 19 is a very snug one so as to produce considerable friction when the attaching bracket is secured to the brake beam.

For applying the safety rod support to the compression member of a brake beam, it is preferred to leave the lugs or jaws 20 wide open and the side portions 16 diverging outwardly from each other sufficiently so that the attaching bracket may be slipped over the compression member in an upward direction, so as to bring the shoulders at the ends of the connecting member 18 in contact with the bottom of the compression member, and then the sides of the attaching member are pressed together so as to bring the shoulders 17 on top of the compression member. The bolt 21 may now be passed through the holes in the lugs 20, the nut applied and the attaching member tightened up in proper position upon the compression member so as to hold the attaching bracket in a rigid position. It will be seen that on tightening up the bolt 21 as required, the journal portion 24 of the loop or stirrup 23 is brought in frictional bearing relation with the under surface of the compression member of the brake beam.

It will be seen that the loop or stirrup 23 is sufficiently large to provide the necessary clearance for the bottom rod 12, so that said rod will not strike the inner side of the supporting loop or stirrup during the oscillating movements of the rod. When friction is resorted to for the purpose of maintaining the loop 23 in normal depending position, as shown in Fig. 3, such friction is required to be such that under normal conditions the loop 23 will remain plumb and not move or cause any objectionable vibration or rattle, the loop 23 only moving when it receives a positive impact. If the loop 23 is struck by an obstructing pile of coal or ballast on the track, the loop will be caused to swing without injury to the connecting rod 12, and hence said rod as well as the supporting loop therefor will not be damaged or broken by the impact.

Attachment bracket 15 may be made in various constructions and be adapted for attachment to brake beam compression members of different cross-sections, and when applied to the compression member and fixed in rigid position it will conform to and fit the cross-section of such compression member. Changes may be resorted to in any manner obvious to those skilled in the art without departing from the scope of the appended claims.

What I claim as new is:

1. In a safety support for brake rods, the combination of a brake beam, an attachment rigidly removably secured to the beam, and a rod supporting member carried swingably by the attachment at a point directly under the beam.

2. In a safety support for brake rods, the combination of a brake beam, an attachment surrounding and removably secured to the beam, a rod supporting member, and a pivotal connection for the supporting member and attachment.

3. In a safety support for brake rods, the combination of a brake beam, a split attachment fixed surrounding and upon the beam and having lugs extending beyond the split, fastening means connecting the lugs, the attachment having a bearing portion underneath the beam, and a rod supporting loop journaled in the bearing portion.

4. In a safety support for brake rods, the combination of a brake beam, an attachment secured to the beam and having a bearing portion, a rod supporting member hung in the bearing portion, and means for causing the bearing portion to hold the supporting member with considerable friction against the beam.

5. In a safety support for brake rods, the combination of a brake beam, a rod supporting loop, and bearing means for attaching the loop to the beam for a swingable movement and providing a strong frictional engagement between the attachment and loop.

6. In a safety support for brake rods, the combination of a brake beam, a rod supporting member, a metal strip passed around the beam and having a bearing portion in which the supporting member is mounted, and means for attaching the ends of the strip together and for holding a portion of the loop against the beam with suitable pressure.

7. In a safety support for brake rods, the combination of a brake beam, a rod supporting member, a metal strip passed around the beam and having a bearing portion in which the supporting member is mounted, and means for attaching the ends of the strip together and for holding a portion of the loop against the beam with suitable pressure, the bearing and supporting member being below the beam and the ends of the strip being above the beam.

SETH A. CRONE.